(12) United States Patent
Tabor

(10) Patent No.: US 6,782,297 B2
(45) Date of Patent: Aug. 24, 2004

(54) METHODS AND APPARATUS FOR DATA SMOOTHING

(76) Inventor: Eric Paul Tabor, 425 W. Merrill Ave., Gilbert, AZ (US) 85233

( * ) Notice: Subject to any disclaimer, the term of this patent is extended or adjusted under 35 U.S.C. 154(b) by 188 days.

(21) Appl. No.: 09/872,195

(22) Filed: May 31, 2001

(65) Prior Publication Data

US 2002/0183868 A1 Dec. 5, 2002

Related U.S. Application Data

(60) Provisional application No. 60/293,577, filed on May 24, 2001.

(51) Int. Cl.[7] .............................................. G05B 13/02
(52) U.S. Cl. ........................... 700/55; 700/52; 708/300
(58) Field of Search .............................. 70/50, 52, 55; 708/300

(56) References Cited

U.S. PATENT DOCUMENTS

| | | |
|---|---|---|
| 4,245,541 A | 1/1981 | Deutsch |
| 5,398,303 A | 3/1995 | Tanaka |
| 5,617,130 A | 4/1997 | Uchiyama et al. |
| 5,666,439 A * | 9/1997 | Ishida et al. ................. 382/190 |
| 5,757,961 A | 5/1998 | Yamakawa et al. |
| 6,084,980 A | 7/2000 | Nguyen et al. |
| 6,240,381 B1 * | 5/2001 | Newson ...................... 704/214 |
| 6,269,326 B1 | 7/2001 | Lejeune |
| 6,310,857 B1 | 10/2001 | Duffield et al. |
| 6,407,480 B1 * | 6/2002 | Nakanishi et al. ...... 310/316.01 |
| 6,426,643 B1 | 7/2002 | Lejeune |
| 6,711,511 B2 * | 3/2004 | Nagase et al. ................. 702/65 |
| 2001/0003532 A1 * | 6/2001 | Ejiri et al. ............. 375/240.03 |

* cited by examiner

*Primary Examiner*—Ramesh Patel
(74) *Attorney, Agent, or Firm*—Noblitt & Gilmore, LLC

(57) ABSTRACT

A method and apparatus for smoothing data comprises adjusting data according to a first smoothing technique and selectively adjusting the data according to a second smoothing technique. The method and apparatus applies a first smoothing technique to a selected datum to adjust a value. The method and apparatus also compares preceding adjusted data to preceding raw data to generate a comparison result and may apply a second smoothing technique to the selected datum according to whether the comparison result meets a threshold. In addition, the method and apparatus of various embodiments may calculate a predicted value of the selected datum and apply another smoothing technique to the selected datum according to whether the predicted value meets a second threshold.

40 Claims, 2 Drawing Sheets

METHODS AND APPARATUS FOR DATA SMOOTHING

CROSS-REFERENCE TO RELATED APPLICATION

This application claims the benefit of U.S. Provisional Patent Application No. 60/293,577, filed May 24, 2001, entitled METHOD AND APPARATUS FOR DATA SMOOTHING, and incorporates the disclosure of such application by reference.

FIELD OF INVENTION

The invention relates to data smoothing.

BACKGROUND OF THE INVENTION

Data smoothing techniques are used to elicit trends from noisy or inconsistent data. The data may comprise any sort of data. For example, the data may be a series of data points taken over time, such as spectroanalysis data from a semiconductor etching system, output test data from a semiconductor testing system, financial data relating to prices or exchange rates that vary with time, and the like. The data may comprise any stream or array of data that varies, but includes a general trend or pattern.

A wide variety of data smoothing techniques have been devised to assist in identifying trends and patterns that may exist in the data. For example, data smoothing techniques include random, random walk, moving average, simple exponential smoothing, linear exponential smoothing, seasonal exponential smoothing, and exponential weighted moving average smoothing. All of these various types of data smoothing techniques may assist in smoothing the data, but include various tradeoffs between effectively smoothing the data and maintaining an accurate reflection of the information in the data.

For example, exponential smoothing techniques are configured to eliminate extreme variations in the data to remove noise. The effect of exponential smoothing is to remove significant variations in the signal, but still track to the overall changes in the data. If the coefficient is too low, however, the exponentially smoothed data does not match effectively the raw data in the event of a relatively sudden change in the raw data. On the other hand, if the coefficient is too high, the smoothing function loses value as more noise is returned to the original data. In many other data smoothing systems, a tradeoff occurs when optimizing for sensitivity without disrupting the smoothing.

SUMMARY OF THE INVENTION

A method and apparatus for smoothing data according to various aspects of the present invention comprises adjusting data according to a first smoothing technique and selectively adjusting the data according to a second smoothing technique. In one embodiment, the method and apparatus applies a first smoothing technique to a selected datum to adjust a value of the selected datum. The method and apparatus also compares preceding adjusted data to preceding raw data to generate a comparison result. The system may apply a second smoothing technique to the selected datum to adjust the value of the selected datum according to whether the comparison result meets a first threshold. In addition, the method and apparatus may calculate a predicted value of the selected datum and apply a third smoothing technique to adjust the value of the selected datum according to whether the predicted value meets a second threshold.

BRIEF DESCRIPTION OF THE DRAWINGS

A more complete understanding of the present invention may be derived by referring to the detailed description when considered in connection with the following illustrative figures, which may not be to scale. Like reference numbers refer to similar elements throughout the figures.

Elements in the figures are illustrated for simplicity and clarity and have not necessarily been drawn to scale. For example, the connections and steps performed by some of the elements in the figures may be exaggerated or omitted relative to other elements to help to improve understanding of embodiments of the present invention.

DESCRIPTION OF EXEMPLARY EMBODIMENTS

The present invention may be described herein in terms of functional block components, software execution, and various process steps. Such functional blocks, execution, and steps may be realized by any number of hardware or software components configured to perform the specified functions. For example, the present invention may employ various machines, processors, storage systems, processes, and integrated circuit components, e.g., arithmetic logic units, memory elements, signal processing elements, logic elements, look-up tables, and the like, which may carry out a variety of functions under the control of one or more microprocessors, controllers, or other control devices. In addition, the present invention may be practiced in conjunction with any number of environments, and the system described herein is merely one exemplary application for the invention. For example, various embodiments and aspects of the present invention may be implemented partially or entirely using software or hardware, and may be integrated into larger systems or separated into other systems. Further, the present invention may employ any number of conventional techniques for data analysis, data processing, I/O transfers, and the like.

Figure 1:
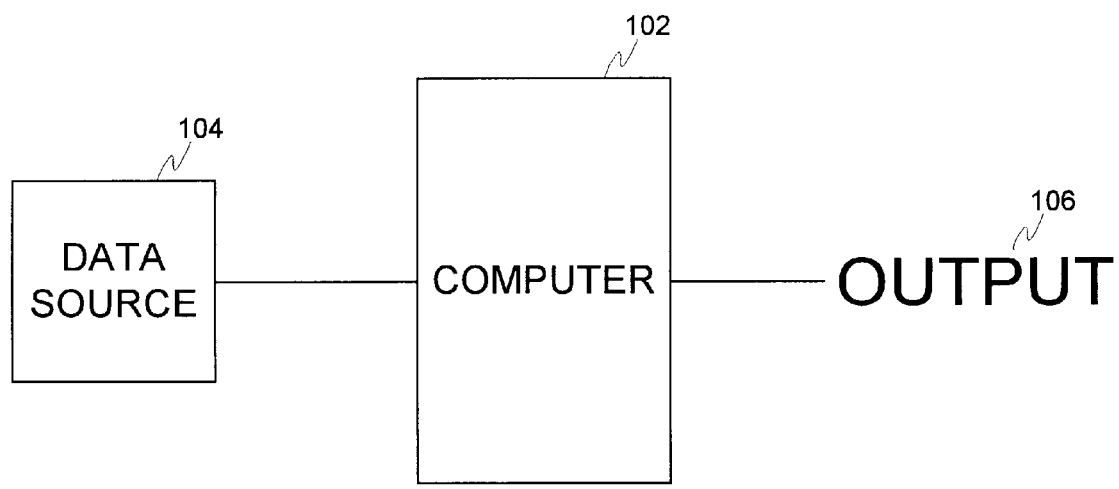
FIG. 1 is a block diagram of a data smoothing system according to various aspects of the present invention.

Referring to FIG. 1, a smoothing method and apparatus 100 according to various aspects of the present invention is suitably implemented, for example, as a program operating on a computer 102 comprising a processor and a memory. The computer 102 communicates with a data source 104 which provides the raw data. The smoothing system 100 also suitably includes an output 106 for transmitting data, such as transmitting smoothed data. The smoothing system 100 suitably comprises multiple phases for smoothing the data according to various criteria. The first phase may include an basic smoothing process. The supplemental phases conditionally provide for enhanced tracking and/or additional smoothing of the raw data.

Figure 2:
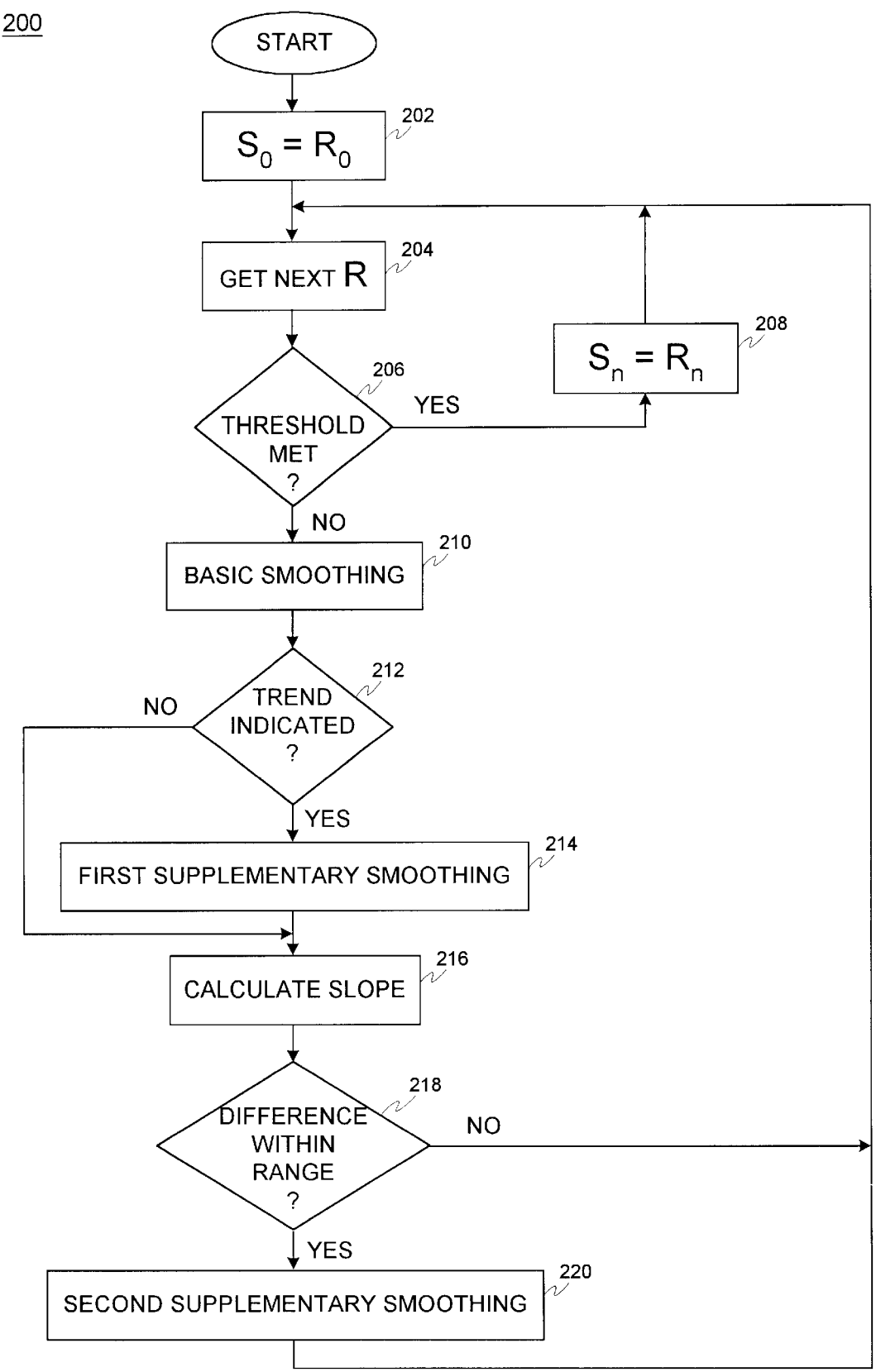
FIG. 2 is a flow chart for operation of an exemplary data smoothing system according to various aspects of the present invention.

The system 100 suitably operates by initially adjusting an initial value of a selected datum according to a first smoothing technique, and supplementarily adjusting the value according to a second smoothing technique if at least one of the initial value and the initially adjusted value meets a threshold. The initial value suitably comprises a raw data value, though it may comprise any other value to be operated upon by the system, such as a processed signal, a datum converted from analog to digital form, or any other value. The first smoothing technique tends to smooth the data. The second smoothing technique also tends to smooth the data and/or improve tracking of the data, but in a different manner from the first smoothing technique. Further, the threshold may comprise any suitable criteria for determining whether to apply supplemental smoothing. In one embodiment, the method and apparatus applies the first smoothing technique to the selected datum to adjust a value of the selected datum. The system 100 compares a plurality of preceding adjusted data to a plurality of preceding raw data to generate a comparison result, and applies a second smoothing technique to the selected datum to adjust the value of the selected datum according to whether the comparison result meets a first threshold. Further, the system 100 suitably calculates a predicted value of the selected datum, and may apply a third smoothing technique to the selected datum to adjust the value of the selected datum according to whether the predicted value meets a second threshold Referring to FIG. 2, a first smoothed data point is suitably set equal to a first raw data point (step 202) and the system 100 proceeds to the next raw data point (step 204). Before performing smoothing operations, the smoothing system 100 initially determines whether smoothing is appropriate for the data point and, if so, performs a basic smoothing operation on the data. Any criteria may be applied to determine whether smoothing is appropriate, such as according to the number of data points received, the deviation of the data point values from a selected value, or comparison of each data point value to a threshold. In the present embodiment, the smoothing system performs a threshold comparison. The threshold comparison determines whether data smoothing is appropriate. If so, the initial smoothing process is suitably configured to proceed to an initial smoothing of the data.

More particularly, in the present embodiment, the process starts with an initial raw data point $R_0$, which is also designated as the first smoothed data point $S_0$. As additional data points are received and analyzed, a difference between each raw data point ($R_n$) and a preceding smoothed data point ($S_{n-1}$) is calculated and compared to a threshold ($T_1$) (step 206). If the difference between the raw data point $R_n$ and the preceding smoothed data point $S_{n-1}$ exceeds the threshold $T_1$, it is assumed that the exceeded threshold corresponds to a significant departure from the smoothed data and indicates a shift in the data. Accordingly, the current smoothed data point $S_n$ is set equal to the raw data point $R_n$ (step 208). No smoothing is performed, and the process proceeds to the next raw data point.

If the difference between the raw data point and the preceding smoothed data point does not exceed the threshold $T_1$, the process calculates a current smoothed data point $S_n$ in conjunction with an initial smoothing process (step 210). The initial smoothing process provides a basic smoothing of the data. For example, in the present embodiment, the basic smoothing process comprises a conventional exponential smoothing process, such as according to the following equation:

$$S_n=(R_n-S_{n-1})*M_1+S_{n-1}$$

where $M_1$ is a selected smoothing coefficient, such as 0.2 or 0.3. The initial smoothing process suitably uses a relatively low coefficient $M_1$ to provide a significant amount of smoothing for the data.

The initial smoothing process may be selected according to any criteria and configured in any manner, however, according to the application of the smoothing system, the data processed, requirements and capabilities of the smoothing system, and/or any other criteria. For example, the initial smoothing process may employ random, random walk, moving average, simple exponential, linear exponential, seasonal exponential, exponential weighted moving average, or any other appropriate type of smoothing to initially smooth the data.

The data may be further analyzed for and/or subjected to smoothing. Supplementary smoothing may be performed on the data to enhance the smoothing of the data and/or improve the tracking of the smoothed data to the raw data. Multiple phases of supplementary smoothing may also be considered and, if appropriate, applied. The various phases may be independent, interdependent, or complementary. In addition, the data may be analyzed to determine whether supplementary smoothing is appropriate.

In the present embodiment, the data is analyzed to determine whether to perform one or more additional phases of smoothing. The data is analyzed according to any appropriate criteria to determine whether supplemental smoothing may be applied (step 212). For example, the system 100 may compare a plurality of adjusted data points and raw data points for preceding data and generate a comparison result according to whether the substantially all of the preceding adjusted data share a common relationship (such as less than, greater than, or equal to) with substantially all of the corresponding raw data. The smoothing system 100 of the present embodiment compares a selected number $P_2$ of raw data points to an equal number of smoothed data points. If the values of all of the $P_2$ raw data points exceed (or are equal to) the corresponding smoothed data points, or if all raw data points are less than (or equal to) the corresponding smoothed data points, then the smoothing system may determine that the data is exhibiting a trend and should be tracked more closely. Accordingly, the smoothing applied to the data may be changed by applying supplementary smoothing. If, on the other hand, neither of these criteria is satisfied, then the current smoothed data point remains as originally calculated and the relevant supplementary data smoothing is not applied.

In the present embodiment, the criterion for comparing the smoothed data to the raw data is selected to identify a trend in the data behind which the smoothed data may be lagging. Accordingly, the number of points $P_2$ may be selected according to the desired sensitivity of the system to changing trends in the raw data.

The supplementary smoothing changes the effect of the overall smoothing according to the data analysis. Any appropriate supplementary smoothing may be applied to the data to more effectively smooth the data or track a trend in the data. For example, in the present embodiment, if the data analysis indicates a trend in the data that should be tracked more closely, then the supplementary smoothing may be applied to reduce the degree of smoothing so that the smoothed data more closely tracks the raw data (step 214).

In the present embodiment, the degree of smoothing is reduced by recalculating the value for the current smoothed data point using a reduced degree of smoothing. Any suitable smoothing system may be used to more effectively track the data or otherwise respond to the results of the data analysis. In the present embodiment, another conventional exponential smoothing process is applied to the data using a higher coefficient $M_2$:

$$S_n=(R_n-S_{n-1})*M_2+S_{n-1}$$

The coefficients $M_1$ and $M_2$ may be selected according to the desired sensitivity of the system, both in the absence ($M_1$) and the presence ($M_2$) of trends in the raw data. In various applications, for example, the value of $M_1$ may be higher than the value of $M_2$.

The supplementary data smoothing may include additional phases as well. The additional phases of data smoothing may similarly analyze the data in some manner to determine whether additional data smoothing should be applied. Any number of phases and types of data smoothing may be applied or considered according to the data analysis.

For example, in the present embodiment, the data may be analyzed and potentially smoothed using a predictive process based on the slope of the smoothed data. The process computes a slope (step 216) based on a selected number P3 of smoothed data points preceding the current data point according to any appropriate process, such as line regression, N-points centered, or the like. In the present embodiment, the data smoothing system uses a "least squares fit through" process to establish a slope of the preceding P3 smoothed data points.

The smoothing system predicts a value of the current smoothed data point according to the calculated slope. The system then compares the difference between the previously calculated value for the current smoothed data point ($S_n$) to the predicted value for the current smoothed data point to a range number ($R_3$) (step 218). If the difference is greater than the range $R_3$, then the current smoothed data point is not adjusted. If the difference is within the range $R_3$, then the current smoothed data point is set equal to the difference between the calculated current smoothed data point ($S_n$) and the predicted value for the current smoothed data point ($S_{n\text{-}pred}$) multiplied by a third multiplier $M_3$ and added to the original value of the current smoothed data point (step 220). The equation:

$$S_n = (S_{n\text{-}pred} - S_n) * M_3 + S_n$$

Thus, the current smoothed data point is set according to a modified difference between the original smoothed data point and the predicted smoothed data point, but reduced by a certain amount (if $M_3$ is less than 1). Applying the predictive smoothing tends to reduce point-to-point noise sensitivity during relatively flat portions of the signal. The limited application of the predictive smoothing process to the smoothed data points ensures that the calculated average based on the slope does not effect the smoothed data when significant changes are occurring in the raw data, i.e., when the raw data signal is not relatively flat.

It should be appreciated that the particular implementations shown and described herein are illustrative of the invention and its best mode and are not intended to otherwise limit the scope of the present invention in any way. Indeed, for the sake of brevity, conventional signal processing, data transmission, and other functional aspects of the systems (and components of the individual operating components of the systems) may not be described in detail herein. Furthermore, the connecting lines shown in the various figures contained herein are intended to represent exemplary functional relationships and/or physical couplings between the various elements. Many alternative or additional functional relationships or physical connections may be present in a practical test system.

The present invention has been described above with reference to a preferred embodiment. However, changes and modifications may be made to the preferred embodiment without departing from the scope of the present invention. These and other changes or modifications are intended to be included within the scope of the present invention.

What is claimed is:

1. A method of smoothing data, comprising:

applying a first smoothing technique to a selected datum to adjust a value of the selected datum;

comparing a plurality of preceding adjusted data to a plurality of preceding raw data to generate a comparison result;

applying a second smoothing technique to the selected datum to adjust the value of the selected datum according to whether the comparison result meets a first threshold;

calculating a predicted value of the selected datum; and applying a third smoothing technique to the selected datum to adjust the value of the selected datum according to whether the predicted value meets a second threshold.

2. A method according to claim 1, further comprising initially determining whether smoothing is appropriate for the selected datum.

3. A method according to claim 2, wherein determining whether smoothing is appropriate comprises at least one of:

comparing the value of the selected datum to a threshold;

determining a number of data received; and determining a deviation of a plurality of data from a value.

4. A method according to claim 2, wherein determining whether smoothing is appropriate comprises:

determining a difference between the value of the selected datum and an adjusted value of a preceding datum; and comparing the difference to a threshold.

5. A method according to claim 1, wherein at least one of the first smoothing technique and the second smoothing technique comprises at least one of:

random smoothing;

random walk smoothing;

moving average smoothing;

simple exponential smoothing;

linear exponential smoothing;

seasonal exponential smoothing; and exponential weighted moving average smoothing.

6. A method according to claim 1, wherein at least one of the first smoothing technique and the second smoothing technique comprises adjusting the value of the selected datum substantially in accordance with the equation:

$$S_n = (R_n - S_{n-1}) * M_1 + S_{n-1}$$

where $S_n$ is the adjusted value of the selected datum, $R_n$ is the value of the selected datum, $S_{n-1}$ is an adjusted value of a preceding datum, and $M_1$ is a selected smoothing coefficient.

7. A method according to claim 1, wherein:

the first smoothing technique comprises adjusting the value of the selected datum substantially in accordance with the equation:

$$S_n = (R_n - S_{n-1}) * M_2 + S_{n-1}$$

where $S_n$ is the adjusted value of the selected datum, $R_n$ is the value of the selected datum, $S_{n-1}$ is an adjusted value of a preceding datum, and $M_1$ is a first selected smoothing coefficient; and the second smoothing technique comprises adjusting the value of the selected datum substantially in accordance with the equation:

$$S_n=(R_n-S_{n-1})*M_2+S_{n-1}$$

where $M_2$ is a second selected smoothing coefficient, and where $M_2$ is greater than $M_1$.

8. A method according to claim 1, wherein comparing the plurality of preceding adjusted data to the plurality of preceding raw data comprises:
   comparing an adjusted value of each of the plurality of preceding adjusted data to a corresponding value of each of the plurality of preceding raw data; and
   generating the comparison result according to whether substantially all of the adjusted values of the plurality of preceding adjusted data share a common relationship with respect to the corresponding values of the plurality of preceding raw data.

9. A method according to claim 1, wherein calculating the predicted value of the selected datum comprises calculating a slope according to a plurality of preceding data.

10. A method according to claim 9, wherein the slope is calculated using at least one of:
   a least squares fit through technique;
   a line regression technique; or
   an N-points centered technique.

11. A method according to claim 1, wherein the second threshold corresponds to a difference between the adjusted value of the selected datum and the predicted value of the selected datum to a range.

12. A method according to claim 1, wherein the third smoothing technique comprises adjusting the value of the selected datum substantially in accordance with the equation:

$$S_n=(S_{n\text{-}pred}-S_n)*M_3+S_n$$

where $S_n$ is the adjusted value of the selected datum, $S_{n\text{-}pred}$ is the predicted value of the selected datum, and $M_3$ is a smoothing coefficient.

13. A method according to claim 1, wherein at least one of the second smoothing technique and the third smoothing technique is configured to improve the tracking of the adjusted value of the selected datum to a selected raw data.

14. A method according to claim 1, wherein at least one of the second smoothing technique and the third smoothing technique is configured to enhance the smoothing of the data.

15. A method according to claim 1, wherein the data comprises at least one of automatic test equipment test data and financial data.

16. A computer readable program for smoothing data, the computer readable program configured to cause a computer to:
   apply a first smoothing technique to a selected datum to adjust a value of the selected datum;
   compare a plurality of preceding adjusted data to a plurality of preceding raw data to generate a comparison result;
   apply a second smoothing technique to the selected datum to adjust the value of the selected datum according to whether the comparison result meets a first threshold;
   calculate a predicted value of the selected datum; and
   apply a third smoothing technique to the selected datum to adjust the value of the selected datum according to whether the predicted value meets a second threshold.

17. A computer readable program according to claim 16, further comprising initially determining whether smoothing is appropriate for the selected datum.

18. A computer readable program according to claim 17, wherein determining whether smoothing is appropriate comprises at least one of:
   comparing the value of the selected datum to a threshold;
   determining a number of data received; and
   determining a deviation of a plurality of data from a value.

19. A computer readable program according to claim 17, wherein determining whether smoothing is appropriate comprises:
   determining a difference between the value of the selected datum and an adjusted value of a preceding datum; and
   comparing the difference to a threshold.

20. A computer readable program according to claim 16, wherein at least one of the first smoothing technique and the second smoothing technique comprises at least one of:
   random smoothing;
   random walk smoothing;
   moving average smoothing;
   simple exponential smoothing;
   linear exponential smoothing;
   seasonal exponential smoothing; and
   exponential weighted moving average smoothing.

21. A computer readable program according to claim 16, wherein at least one of the first smoothing technique and the second smoothing technique comprises adjusting the value of the selected datum substantially in accordance with the equation:

$$S_n=(R_n-S_{n-1})*M_1+S_{n-1}$$

where $S_n$ is the adjusted value of the selected datum, $R_n$ is the value of the selected datum, $S_{n-1}$ is an adjusted value of a preceding datum, and $M_1$ is a selected smoothing coefficient.

22. A computer readable program according to claim 16, wherein:
   the first smoothing technique comprises adjusting the value of the selected datum substantially in accordance with the equation:

$$S_n=(R_n-S_{n-1})*M_1+S_{n-1}$$

where $S_n$ is the adjusted value of the selected datum, $R_n$ is the value of the selected datum, $S_{n-1}$ is an adjusted value of a preceding datum, and $M_1$ is a first selected smoothing coefficient; and
   the second smoothing technique comprises adjusting the value of the selected datum substantially in accordance with the equation:

$$S_n=(R_n-S_{n-1})*M_2+S_{n-1}$$

where $M_2$ is a second selected smoothing coefficient, and where $M_2$ is greater than $M_1$.

23. A computer readable program according to claim 16, wherein comparing the plurality of preceding adjusted data to the plurality of preceding raw data comprises:
   comparing an adjusted value of each of the plurality of preceding adjusted data to a corresponding value of each of the plurality of preceding raw data; and
   generating the comparison result according to whether substantially all of the adjusted values of the plurality of preceding adjusted data share a common relationship with respect to the corresponding values of the plurality of preceding raw data.

24. A computer readable program according to claim 16, wherein calculating the predicted value of the selected datum comprises calculating a slope according to a plurality of preceding data.

25. A computer readable program according to claim 24, wherein the slope is calculated using at least one of:
a least squares fit through technique;
a line regression technique; or
an N-points centered technique.

26. A computer readable program according to claim 16, wherein the second threshold corresponds to a difference between the adjusted value of the selected datum and the predicted value of the selected datum to a range.

27. A computer readable program according to claim 16, wherein the third smoothing technique comprises adjusting the value of the selected datum substantially in accordance with the equation:

$$S_n = (S_{n\text{-}pred} - S_n) * M_3 + S_n$$

where $S_n$ is the adjusted value of the selected datum, $S_{n\text{-}pred}$ is the predicted value of the selected datum, and $M_3$ is a smoothing coefficient.

28. A computer readable program according to claim 16, wherein at least one of the second smoothing technique and the third smoothing technique is configured to improve the tracking of the adjusted value of the selected datum to a selected raw data.

29. A computer readable program according to claim 16, wherein at least one of the second smoothing technique and the third smoothing technique is configured to enhance the smoothing of the data.

30. A computer readable program according to claim 16, wherein the data comprises at least one of automatic test equipment test data and financial data.

31. A method of smoothing data, comprising:
initially adjusting an initial value of a selected datum according to a first smoothing technique; and
supplementarily adjusting the value according to a second smoothing technique if at least one of the initial value and the initially adjusted value meets a threshold.

32. A method according to claim 31, further comprising adjusting at least one of the initial value, the initially adjusted value, and the supplementarily adjusted value of the selected datum according to a third smoothing technique if at least one of the initial value, the initially adjusted value, and the supplementarily adjusted value meets a second threshold.

33. A method according to claim 32, wherein the second threshold corresponds to a difference between the at least one of the initial value, the initially adjusted value, and the supplementarily adjusted value, and a predicted value of the at least one of the initial value, the initially adjusted value, and the supplementarily adjusted value.

34. A method according to claim 31, further comprising initially determining whether smoothing is appropriate for the selected datum.

35. A method according to claim 34, wherein determining whether smoothing is appropriate comprises at least one of:
comparing the initial value to a threshold;
determining a number of data received; and
determining a deviation of a plurality of data from a value.

36. A method according to claim 34, wherein determining whether smoothing is appropriate comprises:
determining a difference between the initial value of the selected datum and an adjusted value of a preceding selected datum; and
comparing the difference to a threshold.

37. A method according to claim 31, wherein at least one of the first smoothing technique and the second smoothing technique comprises at least one of:
random smoothing;
random walk smoothing;
moving average smoothing;
simple exponential smoothing;
linear exponential smoothing;
seasonal exponential smoothing; and
exponential weighted moving average smoothing.

38. A method according to claim 31, wherein the first smoothing technique comprises initially adjusting the initial value of the selected datum substantially in accordance with the equation:

$$S_n = (R_n - S_{n-1}) * M_2 + S_{n-1}$$

where $S_n$ is the adjusted initial value of the selected datum, $R_n$ is the initial value of the selected datum, $S_{n-1}$ is an adjusted value of a preceding selected datum, and $M_1$ is a selected smoothing coefficient.

39. A method according to claim 38, wherein the second smoothing technique comprises supplementarily adjusting the initially adjusted value of the selected datum substantially in accordance with the equation:

$$S_n = (R_n - S_{n-1}) * M_2 + S_{n-1}$$

where $M_2$ is a second selected smoothing coefficient, and where $M_2$ is greater than $M_1$.

40. A method according to claim 31, wherein the data comprises at least one of automatic test equipment test data and financial data.

* * * * *